United States Patent
Faust et al.

[11] Patent Number: 6,123,634
[45] Date of Patent: Sep. 26, 2000

[54] INFINITELY VARIABLE-SPEED TRANSMISSION

[75] Inventors: Hartmut Faust, Bühl-Moos; Richard Stark, Bühlertal, both of Germany

[73] Assignee: LuK Getriebe-Systeme GmbH, Buhl, Germany

[21] Appl. No.: 08/946,534

[22] Filed: Oct. 7, 1997

[30] Foreign Application Priority Data

Oct. 8, 1996 [DE] Germany ............... 196 41 311

[51] Int. Cl.[7] ............... F16H 55/56; F16H 59/00; F16H 61/00
[52] U.S. Cl. ............... 474/8; 474/18; 474/28
[58] Field of Search ............... 474/8, 18, 28, 474/69, 70, 11, 12, 17, 23, 43, 91, 161, 190, 191, 192

[56] References Cited

U.S. PATENT DOCUMENTS

| | | | |
|---|---|---|---|
| 2,673,470 | 3/1954 | Cosmos | 474/192 |
| 2,778,234 | 1/1957 | Carter | 474/192 |
| 4,571,226 | 2/1986 | Molloy et al. | 474/190 |
| 4,722,722 | 2/1988 | Rampe | 474/192 |
| 4,838,842 | 6/1989 | Ohkata et al. | 474/192 |
| 5,021,034 | 6/1991 | Allen | 474/190 |
| 5,098,346 | 3/1992 | Redmond | 474/161 |
| 5,169,365 | 12/1992 | Friedman | 474/18 |
| 5,766,105 | 6/1998 | Fellows et al. | 474/28 |
| 5,797,819 | 8/1998 | Arai | 474/190 |
| 5,879,253 | 3/1999 | Friedmann et al. | 474/18 |

FOREIGN PATENT DOCUMENTS

| | | |
|---|---|---|
| 0518 478 B1 | 2/1996 | European Pat. Off. . |
| 3027834 | 11/1982 | Germany . |
| 3447092 | 7/1986 | Germany . |
| 3324318 | 7/1987 | Germany . |
| 3447092 | 6/1989 | Germany . |
| 3826809 | 8/1989 | Germany . |
| 0 341 474 | 11/1989 | Germany . |
| 4134658 | 4/1992 | Germany . |
| 4201692 | 8/1992 | Germany . |

Primary Examiner—David A. Bucci
Assistant Examiner—Matthew A. Kanese
Attorney, Agent, or Firm—Darby & Darby

[57] ABSTRACT

An infinitely variable-speed transmission for use in the power train of a motor vehicle has two rotary sheaves and an endless flexible element trained over the sheaves to transmit torque from the flanges of one of the sheaves to the flanges of the other sheave when the one sheave is driven by the prime mover of the vehicle. The flanges have exposed conical surfaces which are frictionally engaged by the exposed end surfaces of pintles forming part of the flexible element when the latter transmits torque. The flanges are hardened, cushioned, roughened and/or otherwise treated at their exposed surfaces to promote the ability of the sheaves to eliminate or reduce noise on contact with the pintles, to stand long periods of use without extensive wear, and/or to transmit pronounced and variable torques.

45 Claims, 4 Drawing Sheets

INFINITELY VARIABLE-SPEED TRANSMISSION

BACKGROUND OF THE INVENTION

The present invention relates to torque transmitting systems in general, and more particularly to improvements in transmissions for use in the power trains of motor vehicles. Still more particularly, the invention relates to improvements in variable-speed transmissions, such as infinitely variable-speed transmissions, which can be utilized in the power trains of motor vehicles to transmit torque between a prime mover (such as a combustion engine, a hybrid prime mover, a friction clutch or a hydrokinetic torque converter) and the wheels of a motor vehicle. Still more particularly, the invention relates to improvements in transmissions of the type disclosed in commonly owned U.S. Pat. No. 5,169,365 granted Dec. 8, 1992 to Oswald Friedmann for "POWER TRAIN". Transmissions of such character are also known as variators. The disclosure of the U.S. Pat. No. 5,169,365 (as well as of each other patent or patent application mentioned in this specification and being properly incorporable by reference) is incorporated herein by reference.

The transmission which is disclosed in U.S. Pat. No. 5,169,365 comprises two adjustable pulleys or sheaves (hereinafter called sheaves) and an endless flexible device (such as a chain or a belt and hereinafter called chain for short) which is trained over the sheaves to transmit torque from one of the sheaves (such one sheave can be driven by the prime mover of the motor vehicle) to the other sheave. Each sheave comprises an axially fixed first flange and a second flange which is movable axially of the first flange in order to change the intensity of frictional engagement between the chain and the sheaves and/or to change the ratio of the patented transmission.

Transmissions (variators) of the above outlined character are also disclosed in published European patent application Serial No. 0 341 474. European patent No. 0 518 478 discloses sprocket chains which can be utilized as endless torque transmitting devices in transmissions of the type disclosed in U.S. Pat. No. 5,169,365 and/or in published European patent application Serial No. 0 341 474. A satisfactory chain (such as a sprocket chain or any other link conveyor) normally comprises a series of interconnected contact elements which are spaced apart from one another in the longitudinal direction of the chain or conveyor and have end faces adapted to frictionally engage the adjacent surfaces of flanges forming part of the two sheaves to thus transmit torque from the prime mover-driven sheave to the other sheave when the transmission is in actual use.

Since the aforementioned contact elements of the chain are spaced apart from each other in the longitudinal direction of the chain, they engage the adjacent surfaces (normally conical surfaces) on the flanges of each of the two sheaves at timely spaced intervals at a frequency which depends upon the speed of the chain and upon the mutual spacing of neighboring (successive) contact elements from one another. The loci of actual contact between the surfaces of the flanges of the two sheaves on the one hand, and the end portions of the momentarily adjacent contact elements on the other hand, constitute the corners of two pairs of registering polygons. The reliability of frictional engagement between the chain and the sheaves depends upon the areas of contact between the end faces of the contact elements and the adjacent surfaces of the flanges, upon the friction coefficients of such parts, and upon the forces with which the axially movable flanges are urged against the other flanges of the respective sheaves.

It has been found that repeated engagement of successive contact elements of the chain with, and repeated disengagement of such contact elements from, the adjacent surfaces of the two flanges of each sheave is apt to generate pronounced (readily detectable) noise. As a rule, the flanges of the sheaves and the contact elements of the chain are metallic parts which are bound to generate sounds, at least when successive contact elements of the chain are caused to impinge upon the adjacent surfaces of the flanges of one of the sheaves, thereafter upon the surfaces of the flanges of the other sheave, again upon the surfaces of flanges of the one sheave, and so forth.

OBJECTS OF THE INVENTION

An object of the invention is to provide a transmission of the type known as variator which is less likely to generate noise than heretofore known transmissions of such character.

Another object of the invention is to provide a power train which embodies the improved transmission and can be utilized in motor vehicles for the transmission of motion between a prime mover (such as a combustion engine) and a differential or another torque receiving system.

A further object of the invention is to provide an at least substantially quiet infinitely variable-speed transmission of the type wherein an endless flexible device is trained over and transmits rotary motion between driving and driven sheaves or pulleys.

An additional object of the invention is to provide a novel and improved endless flexible torque transmitting device for use in the above outlined infinitely variable-speed transmission.

Still another object of the invention is to provide novel and improved pulleys or sheaves for use in the above outlined transmission.

A further object of the invention is to provide a transmission wherein the sheaves and/or the endless flexible torque transmitting device can stand long periods of extensive use with lesser wear than in heretofore known transmissions of the type known as variators.

Another object of the invention is to provide a simple and inexpensive transmission which can be utilized as a superior substitute for conventional transmissions of the type wherein a chain, a belt or another suitable endless flexible device is utilized to transmit torque between two adjustable rotary sheaves.

An additional object of the invention is to provide a novel and improved method of prolonging the useful lives of component parts of an infinitely variable-speed transmission of the above outlined character.

Still another object of the invention is to provide a conveyance wherein the power train embodies a transmission of the above outlined character.

A further object of the invention is to provide a transmission which can be readily assembled or taken apart within short intervals of time.

Another object of the invention is to provide an an infinitely variable-speed transmission which can be readily adjusted to rotate one or more driven parts at any one of a wide range of speeds.

An additional object of the invention is to provide a transmission which is not only quieter but also less expensive, longer-lasting, at least as compact as, and less complex than heretofore known transmissions of the type wherein at least one endless chain, belt or an analogous flexible device is employed to transmit torque from a first sheave to a second sheave or in the opposite direction.

SUMMARY OF THE INVENTION

One feature of the present invention resides in the provision of a transmission for use in a power train of a motor vehicle. The improved transmission comprises first and second rotary sheaves and an endless flexible torque transmitting device which is trained over the sheaves. The sheaves have first contact portions and the device has at least one second contact portion in frictional engagement with the first contact portions to transmit torque from one of the sheaves to the other sheave when the one sheave is rotated (e.g., by a prime mover). At least one of (a) the first sheave, (b) the second sheave, and (c) the endless flexible device has means for influencing the aforementioned frictional engagement.

The transmission can constitute an infinitely variable-speed transmission.

Another feature of the invention resides in the provision of a transmission (such as an infinitely variable-speed transmission) for use in the power train of a motor vehicle, e.g., for use between a combustion engine and the differential in the power train of a passenger car, a truck or another wheel-mounted conveyance. The improved transmission comprises first and second rotary sheaves, and an endless flexible torque transmitting device which is trained over the sheaves. The sheaves have first contact portions and the torque transmitting device has at least one second contact portion in frictional engagement with the first contact portions to transmit torque from one of the sheaves to the other sheave when the one sheave is rotated by a prime mover or in any other suitable way. At least the first sheave has an additional portion (such additional portion can include two flanges having confronting mirror symmetrical conical surfaces flanking that portion of the torque transmitting device which is trained over the first sheave) in at least substantial torque transmitting engagement with the respective first contact portion, and the transmission is further provided with at least one fluid film between the contact portion and the additional portion of the first sheave. As a rule, the transmission contains a supply of fluid (such as oil), and the at least one fluid film preferably forms part of such supply.

The torque transmitting engagement between the portions of the first sheave is or can be a form-locking engagement which compels such portions of the first sheave to rotate with each other about the axis of the first sheave.

Alternatively, the torque transmitting engagement between the portions of the first sheave can be a frictional engagement.

The first contact portion of the first sheave (and/or of the second sheave) can be thin-walled, and such contact portion can have an at least substantially conical shape (e.g., it can constitute a hollow cone or conical frustum of sheet metal or the like).

The first contact portion of the first sheave (and/or of the second sheave) can be crowned.

The additional portion of the first sheave can include a flange having a radially outer portion, and the contact portion of the first sheave can include a thin-walled shroud or cover having a rim which surrounds the radially outer portion of the flange. The rim can include or constitute a substantially annular collar.

The construction of the second flange is (but need not always be) identical with or similar to that of the first sheave.

Alternatively, the radially inner portion of the flange of the first sheave (i.e., the portion which is close to and surrounds a central axis of the first sheave) can be provided with at least one socket for a complementary projection of the contact portion of the first sheave. The projection can include a collar which is provided at a radially inner portion of a substantially frustoconical shroud which forms part of or constitutes the contact portion of the first sheave. Such projection can extend, at least substantially, in the direction of the central axis of the first sheave. The projection can but need not always be at least substantially ring-shaped. Such projection can include a plurality of sections which are spaced apart from each other in a circumferential direction and preferably extend in parallelism with the axis of the first sheave.

The purpose of the (one piece or composite) projection or projections of the contact portion of the first sheave is or can be to ensure that the contact portion and the additional portion of the first sheave always rotate as a unit. For example, the (or each) projection of the contact portion of the first sheave can be form-lockingly connected to the additional portion of the first sheave.

It is also possible to provide the first sheave (or each sheave) with one or more fasteners serving to non-rotatably secure the contact portion to the additional portion. Each fastener can include or constitute a threaded fastener, a rivet or a suitable protuberance provided on the contact portion or additional portion and received in a complementary socket or recess of the other portion of the respective sheave.

The contact portion of the first sheave can be bonded to the additional portion of such sheave, e.g., by resorting to a suitable adhesive, by welding or by soldering.

It often suffices (or it might even be preferable—under certan circumstances) to simply maintain the contact portion of the first sheave in mere frictional engagement with the additional portion as long as the frictional engagement suffices to ensure that the two portions of such sheave share rotary movements about the central axis of the sheave.

Alternatively, the contact portion of the first and/or second sheave can be a press fit on the additional portion of the respective sheave. In fact, even a loose fit can suffice as long as the two portions of the first and/or second sheave can rotate with each other under circumstances when such joint rotation is necessary for proper operation of the transmission.

The contact portion of at least one of the sheaves can comprise at least one layer or stratum or film of a metallic material, e.g., a sheet of metallic material.

It is also possible to assemble the contact portion of at least one of the sheaves of a plurality of discrete or interconnected components, and at least one of these components can consist of a sheet material, e.g., a metallic sheet material.

The contact portion of at least one of the sheaves can be laminaed, and such laminated portion can include at least one metallic layer or film.

The contact portion of at least one of the sheaves can comprise at least one flexible layer, e.g., a flexible layer consisting of or containing a synthetic plastic material. It is also possible to provide at least one of the sheaves with a contact portion including at least one layer which contains or consists of an elastomeric material.

Still further the contact portion of at least one of the sheaves can contain or consist of a damping layer, e.g., a sound deadening layer which contains or consists of a suitable synthetic plastic material. It is often advisable to employ a damping layer which consists of an elastomeric material.

In accordance with a presently preferred embodiment, the contact portion of at least one of the sheaves comprises at least one thin-walled member which overlies the aforementioned fluid film.

A further feature of the invention resides in the provision of a transmission for use in the power train of a motor vehicle and comprising first and second rotary sheaves as well as an endless flexible torque transmitting device which is trained over the sheaves. The sheaves have first contact portions and the torque transmitting device has at least one second contact portion in frictional engagement with the first contact portions to transmit torque from one of the sheaves to the other sheave when the one sheave is rotated, e.g., by a prime mover. At least one of the contact portions has an exposed surface which is treated to enhance at least one of a plurality of desirable characteristics of the respective contact portion, such as reduction of noise, resistance to wear and/or slip, ability to transmit pronounced and variable torques, and low cost.

The at least one contact portion can be hardened, at least in the region of its surface. Alternatively, such contact portion can be thin-walled and can be hardened at least substantially all the way between its exposed surface and a second surface located opposite the exposed surface. The treatment of the exposed surface can involve blasting (such as sandblasting) or peening. Still further, such treatment can include bombardment with a volatile material. At least one of the first contact portions can include a substantially conical layer (e.g., a laminate) overlying at least one body of a fluid.

The method of making the improved transmission comprises the step of treating at least the sheaves at the exposed surfaces of their contact portions with a view to enhance at least one of a plurality of desirable characteristics of the sheaves including a reduction or elimination of noise which tends to develop as a result of engagement of the exposed surfaces of the flanges with the exposed surfaces of the flexible torque transmitting device when such device is in the process of transmitting torque, promoting the resistance of the flanges to wear and to slippage relative to the torque transmitting device, and ability to transmit pronounced, small and/or variable torques.

The novel features which are considered as characteristic of the invention are set forth in particular in the appended claims. The improved transmission itself, however, both as to its construction, the method of making and the mode of assembling, installing and utilizing the same, together with numerous additional important and advantageous features thereof, will be best understood upon perusal of the following detailed description of certain presently preferred specific embodiments with reference to the accompanying drawings.

BRIEF DESCRIPTION OF THE DRAWINGS

FIG. 3b shows a portion of a sheave in a fragmentary sectional view similar to that of FIG. 3a but constituting a modification of the sheaves shown in FIGS. 1 and 3a;

DESCRIPTION OF PREFERRED EMBODIMENTS

Figure 1:
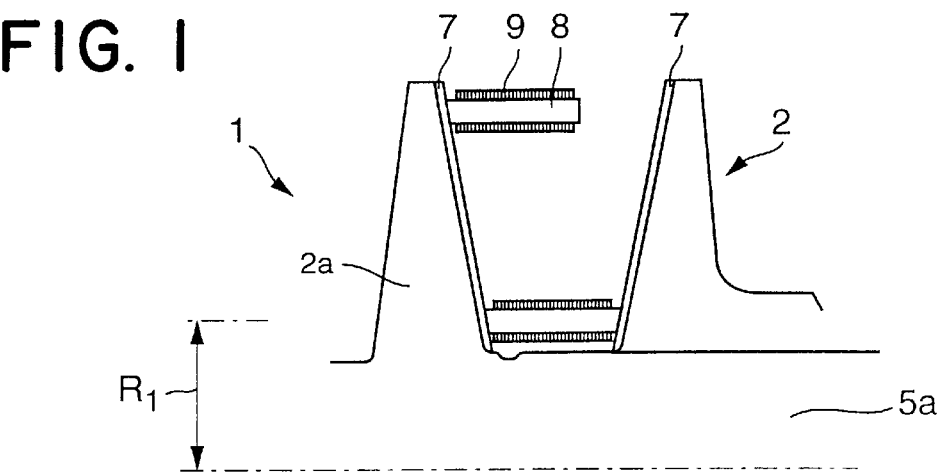
FIG. 1 is a fragmentary schematic partly elevational and partly sectional view of the sheaves and the chain of a transmission which embodies one form of the present invention, one flange of each of the sheaves being shown in two different axially spaced-apart positions.
Figure 1:
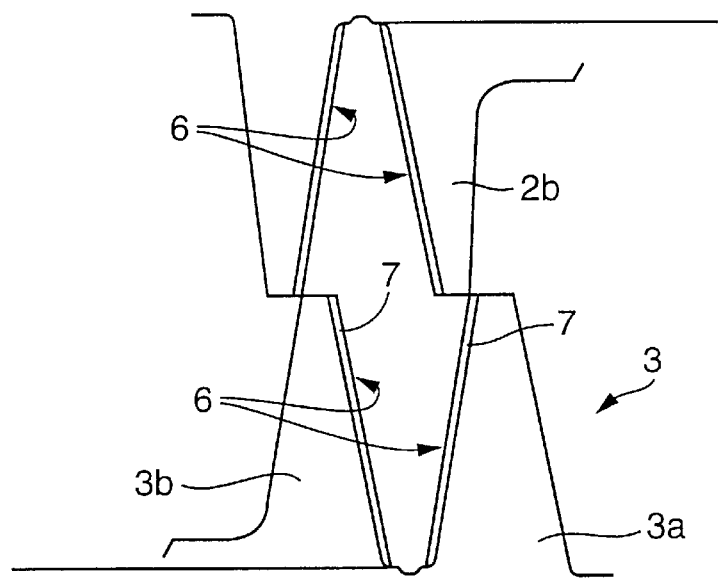
Figure 1:
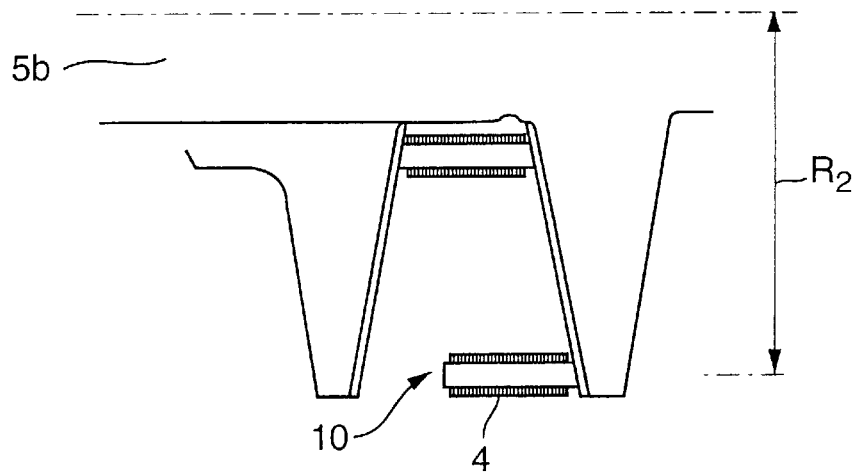

Referring first to FIG. 1, there is shown a portion of an infinitely variable-speed transmission 1 which comprises a first pulley or sheave 2, a second pulley or sheave 3, and an endless flexible torque transmitting device (e.g., a chain or a belt or band and hereinafter called chain) 4 which is trained over the pulleys 2 and 3. The transmission 1 can be put to use in the power train of a motor vehicle, e.g., in a manner to be described hereinafter with reference to FIG. 2, namely in such a way that a prime mover can transmit torque to the sheave 2 and that the sheave 3 can receive torque from the sheave 2 by way of the chain 4 and can transmit torque to a differential or to another torque receiving system.

The first sheave 2 comprises a contact portion 7 and an additional portion composed of two coaxial flanges 2a, 2b surrounding a common shaft 5a which can receive torque from the prime mover of the motor vehicle. The flange 2a is rigid (e.g., of one piece) with the shaft 5a, and the flange 2b is non-rotatably but axially movably mounted on the shaft 5a so that it can move toward or away from the axially fixed flange 2a. The upper half of the flange 2b (as viewed in FIG. 1) is shown at a greater first and the lower half of this flange is shown at a lesser second axial distance from the fixed flange 2a.

The construction of the sheave 3 (the axis of this sheave is parallel to that of the shaft 5a) is or can be identical with that of the sheave 2. Thus, the sheave 3 comprises a contact portion 7 and an additional portion including a flange 3a affixed to a shaft 5b and a flange 3b non-rotatably but axially movably mounted on the shaft 5b. The upper half of the flange 3b is shown at a lesser axial distance and the lower half of this flange is shown at a greater axial distance from the axially fixed flange 3a.

The means for moving the flanges 2b, 3b axially toward or away from the respective axially fixed flanges 2a, 3a is not shown in FIG. 1. Reference should be had to U.S. Pat. No. 5,169,365. The arrangement is such that each of these moving means comprises one or two motors, e.g., one for moving the respective flange 2b or 3b axially to any one of a desired (e.g., infinite) number of different positions (i.e., for changing the ratio of the transmission 1) and the other for maintaining the flange 2b or 3b in a selected axial position with a desired (variable) force. Presently preferred motors for the axially movable flanges 2b, 3b are fluid-operated (hydraulic or pneumatic) double-acting cylinder and piston units.

The ratio of the transmission 1 is determined by the radii R1 and R2. The radius R1 is the radius of curvature of that arcuate portion of the chain 4 which is trained over the sheave 2 (i.e., which is located between the flanges 2a, 2b), and the radius R2 is the radius of curvature of that arcuate portion of the chain 4 which is trained over the sheave 3 (i.e., which is located between the flanges 3a, 3b). The aforementioned motors for the axially movable flanges 2b, 3b render it possible to vary the radii R1 and R2 within the desired ranges and to thus select the ratio of the transmission 1 accordingly. It will be appreciated that the radius R1 increases when the radius R2 decreases, and vice versa. The means for selecting any one of an infinite number of transmission ratios (within a certain range) can be designed and operated in a manner as disclosed in U.S. Pat. No. 5,169,365.

The contact portions 7 are shown in the form of hollow frustoconical layers or discs which have conical chain-contacting exposed surfaces 6 and overlie the adjacent surfaces of the respective pairs of flanges (2a, 2b and 3a, 3b) of the sheaves 2 and 3. The surfaces 6 are frictionally engaged by the exposed end surfaces 10 of certain ones of a set of elongated axially parallel (second) contact portions 8 forming part of the chain 4 and being articulately connected to each other by the links 9 of the chain 4. As can be readily seen in FIG. 1, the end surfaces 10 of a first group of contact portions 8 (hereinafer called studs for short) frictionally engage the surfaces 6 of the layers 7 on the flanges 2a, 2b close to the axis of the shaft 5a when the end surfaces 10 of a second group of studs 8 frictionally engage the surfaces 6 of the layers 7 on the flanges 3a, 3b at a greater radial distance from the axis of the shaft 5b, and vice versa.

The layers 7 can be of one piece with the respective flanges 2a, 2b, 3a, 3b; the surfaces 6 then constitute the exposed surfaces of the respective flanges. If the layers 7 are separate parts, they are preferably configurated to closely follow the outlines of the adjacent (conical) surfaces of the respective flanges.

In accordance with one embodiment of the present invention, certain important characteristics of the sheaves 2 and 3 (and, if necessary, of the studs 8) can be enhanced by subjecting the surfaces 6 (and/or the surfaces 10) to one or more special treatments. For example, the surfaces 10 and/or 6 can be bombarded (such as blasted or peened) with suitable particulate materials such as sand, small spheres and/or others. It is also possible to bombard the exposed surfaces 10 and/or 6 with a volatile or volatilizable solid material which evaporates. shortly or immediately following impingement upon the respective exposed surfaces. An example of a solid material which is sufficiently volatile is solid CO2; such material can undergo a desirable phase change in the course of or shortly subsequent to bombardment of the surfaces 10 and/or 6. It is to be noted that the just discussed bombardment can involve suitable treatment of surfaces 10 and/or 6 as well as of certain other surfaces of component parts (such as 2, 3 and 4) of the improved transmission. CO2 is solid below a critical temperature but evaporates at room temperature if it is maintained at or close to a predetermined (such as atmospheric) pressure.

The purpose of bombardment (such as sandblasting, peening or impingement by particles of evaporable solid material) is to reinforce (harden) the material adjacent the respective exposed surfaces. In addition, such treatment can cause the treated materials to develop desirable internal stresses at the treated surfaces. The internal stresses can exert a desirable influence upon the fatigue strength of the treated constituents of the transmission.

It is often advisable to carry out the aforediscussed surface treatment subsequent to hardening and following grinding and/or turning of the constituents of the transmission. Furthermore, the bombardment of the surfaces 10 and/or 6 can be resorted to in lieu of grinding and/or hardening, i.e., one can dispense with, or at least simplify, at least one of heretofore customary (often complex, time-consuming and expensive) treatments. In other words, one can resort to bombardment in conjunction with simpler and relatively inexpensive grinding, turning, hardening and/or other treatments or as a substitute for one or more heretofore known or customary treatments.

It is also possible to subject the flanges 2a, 2b, 3a, 3b and/or the contact portions or layers 7 to a crowning treatment which conforms to the crowning of the end surfaces 10 of the studs 8 forming part of the chain 4. Reference may be had to German patent No. 34 47 092 which discloses a suitable treatment to arrive at a desirable and advantageous crowning.

The provision of contact portions 7 contributes to a pronounced reduction of noise on impact of the end surfaces 10 against the adjacent exposed surfaces 6. In addition, the contact portions 7 contribute to a significant reduction of the cost of making the transmission 1 because it often suffices to harden only the contact portions 7 in lieu of a hardening of relatively large portions of the respective flanges 2a, 2b, 3a, 3b. In fact, it often suffices to harden the contact portions 7 only in the regions of their exposed surfaces 6 instead of hardening each such contact portion all the way between the exposed surface 6 and the other surface which is immediately adjacent the respective flange. At least partial hardening of the contact portions 7 (i.e., at least along the respective exposed surfaces 6) is advisable in order to reduce wear and to thus prolong the useful lives of such contact portions as well as of the entire flanges (i.e., of the entire sheaves).

The exact ratio of the transmission 1 (i.e., the lengths of the radii R1 and R2) will depend upon the operating condition of the prime mover and/or upon the desire of the operator of the motor vehicle.

The studs 8 of the chain 4 can be equidistant from each other, as seen in the longitudinal direction of the chain, or they may form equidistant groups, e.g., groups of two studs each. As a rule, the plane of the chain 4 is normal to the central axes of the sheaves 2 and 3, i.e., to the axes of the shafts 5a and 5b.

Each stud 8 can extend into an opening of a discrete link 9. The links 9 can be assembled into two-link or three-link or n-link composites or connections or sequences. Reference may be had to German patents Nos. 30 27 834, 33 24 318 and 38 26 809 which disclose two-link and three-link assemblies.

If the flanges 2a, 2b, 3a, 3b are provided with contact portions 7, the end surfaces 10 of two spaced-apart groups of successive studs 8 respectively abut and frictionally engage the exposed surfaces 6 of contact portions 7 on the flanges 2a, 2b and the exposed surfaces 6 of contact portions on the flanges 3a, 3b. In the absence of contact portions 7, the end surfaces 10 directly abut the exposed surfaces of the flanges 2a, 2b and 3a, 3b; these flanges are then hardened or otherwise treated along their exposed surfaces to reduce the likelihood of extensive wear and to thus prolong the useful lives of the sheaves 2 and 3. The frictional engagement between the end surfaces 10 and the exposed surfaces 6 of the discrete contact portions 7 or the exposed surfaces of the flanges 2a, 2b, 3a, 3b should be sufficiently pronounced to ensure the transmission of desired torques or forces.

An additional purpose or function of the studs 8 is to exert a pull upon the corresponding links 9, i.e., to draw the links in the direction of advancement of the chain 4 from the torque-receiving sheave to the torque-transmitting (prime mover-driven) sheave.

It is clear that the chain 4 is further provided with means for preventing axial movements of the studs 8 relative to the links 9 which are articulately connected therewith. For example, such preventing means can be provided at one or both axial ends of each stud 8. The studs 8 act not unlike the pintles between the leaves of a hinge.

Figure 2:
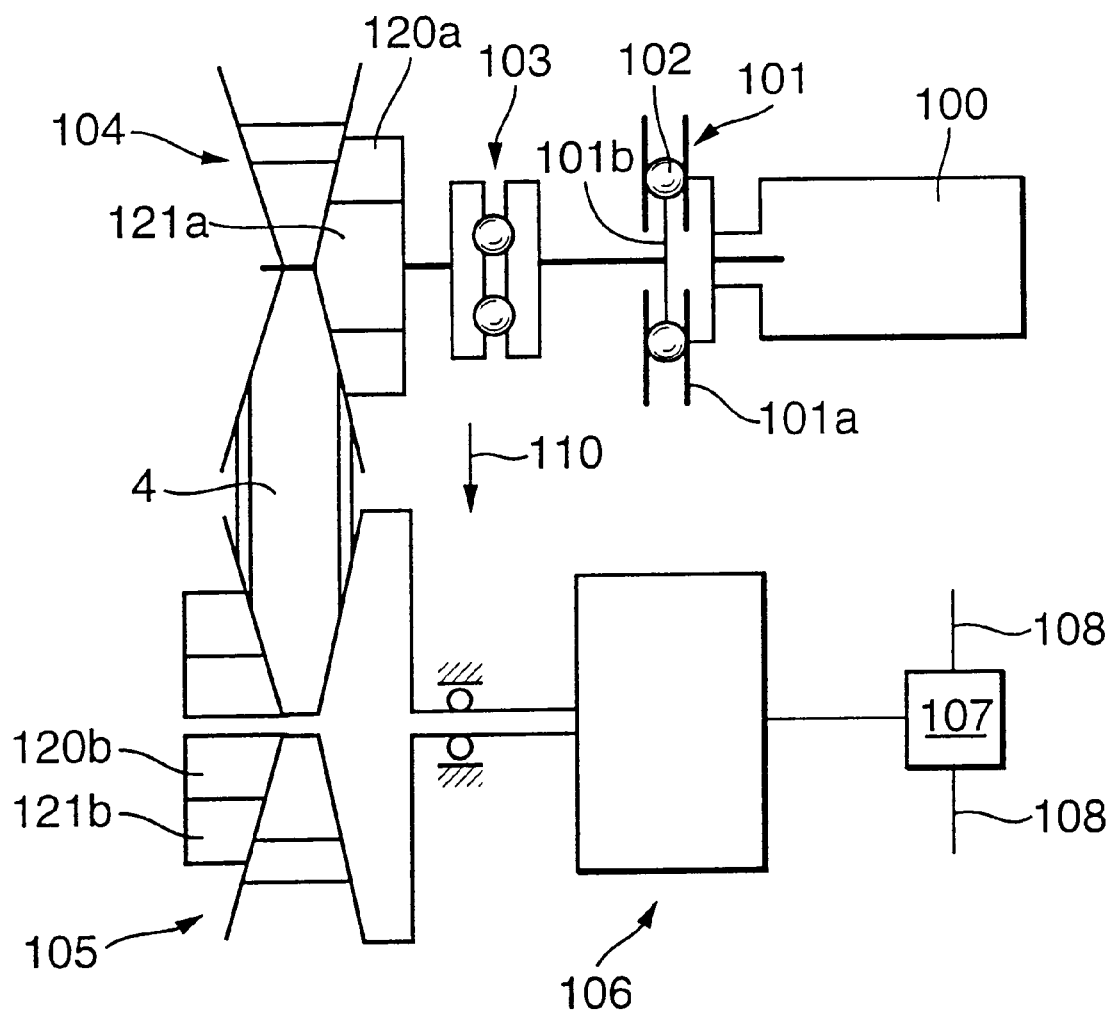
FIG. 2 is a diagrammatic view of a power train which can be utilized in a motor vehicle and employs an infinitely variable-speed transmission embodying the invention.

FIG. 2 is a diagrammatic view of a power train including an infinitely variable-speed transmission having two sheaves 104, 105 and a chain 4 and being installed between a prime mover 100 and a differential 107. The output shaft of the prime mover 100 (e.g., an internal combustion engine, a motor or a hybrid prime mover) drives the rotary input member 101a of a damper 101, and this input member drives a rotary output member 101b through the medium of a set of energy storing elements 102 (e.g., coil springs) which oppose rotation of the input member 101a until they store sufficent amounts of energy to compel the output member 101b to rotate with the input member 101a. If necessary, the damper 101 can comprise one or more friction generating devices (e.g., slip clutches, not shown) in addition to or instead of the energy storing elements 102.

The output member 101b of the damper 101 transmits torque to a torque sensor 103 which, in turn, transmits torque to the shaft (not specifically shown but corresponding to the shaft 5a) of the sheave 104. The sensor 103 can constitute a single-stage or a multistage torque sensor; reference may be had to U.S. Pat. No. 5,169,365 and/or to published German patent application Serial No. 42 34 294.

The axially movable flange of the sheave 104 is adjustable and can be stressed by two fluid-operated motors (such as double-acting hydraulic or pneumatic cylinder and piston units) having plenum chambers 120a and 121a. The piston of one of these units is acted upon by pressurized fluid in the chamber 120a or 121a to move the axially movable flange of the sheave 104 to a selected axial position, and the piston of the other unit is acted upon by pressurized fluid in the chamber 121a or 120a to maintain the axially movable flange of the sheave 104 in a selected axial position with a desired force. As concerns the construction and the mode of operation of an adjustable sheave which can be utilized in the transmission of FIG. 2, reference may also be had to the published German patent applications Serial Nos. 42 01 692 and 41 34 658.

The chain 4 normally transmits torque from the prime mover 100, via damper 101, torque sensor 103 and sheave 104, on to the sheave 105 which is, or which can be, identical with the sheave 104. FIG. 2 merely shows two plenum chambers 120b, 121b which respectively correspond to the aforedescribed plenum chambers 120a, 121a. The direction of transmission of torque from the sheave 104 to the sheave 105 (via chain 4) when the sheave 104 is driven by the prime mover 100 is indicated by an arrow 110.

The reference character 106 denotes a starter and a device for reversing (when necessary) the direction of rotation of the sheaves 104, 105. Reference may be had again to U.S. Pat. No. 5,169,365. The means denoted by the block 106 can be installed downstream of the sheave 105 (as seen in the direction of the arrow 110) or upstream of the sheave 104. The starter can include a starter clutch or a hydrokinetic torque converter.

The differential 107 receives torque from the shaft of the sheave 105 and drives two axles 108 for the wheels of the motor vehicle. The differential 107 is driven by the sheave 105 when the vehicle is in the process of pulling a load, and the differential drives the sheave 105 (which, in turn, drives the sheave 104 if the transmission of FIG. 2 is engaged) when the vehicle is coasting.

FIGS. 3a, 3b, 3c and 3d illustrate four different modes of reinforcing the flanges of sheaves which can be utilized in the transmission of the present invention.

Figure 3A:
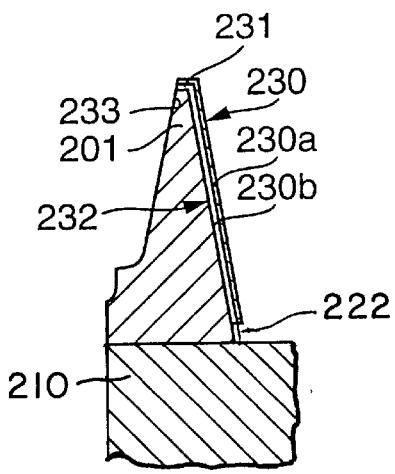
FIG. 3a is a fragmentary axial sectional view of one sheave in a transmission constituting a modification of the transmission which is illustrated in FIG. 1.

FIG. 3a shows a portion of an axially fixed flange 201 which is rigidly affixed to a rotary shaft 210. The flange 201 has a radially outer (marginal) portion 233 which is at least partially surrounded by an axially extending collar or rim 231 of a conical contact portion 230 having an exposed conical surface 230a engageable by the end surfaces 206 of studs or pintles 204 forming part of an endless chain 203 and connecting a series of chain links 205 to one another. The rim 231 is preferably crowned and the contact portion 230 includes several discrete or coherent layers or strata including an outer layer bearing the exposed surface 230a and at least one additional layer 230b adjacent the conical surface 232 of the flange 201.

The central opening 222 of the contact portion 230 receves the adjacent portion of the shaft 210 with a certain clearance. However, it is also possible to reduce the diametter of the opennig 222 so that the shaft 210 is a snug or snugger fit therein.

The rigid connection between the flange 201 and the shaft 210 can comprise mating teeth or the like (not shown) which prevent rotation of the parts 201, 210 relative to each other, and one or more substantially radially extending screws, bolts, pins or like parts which hold the flange 201 against movement in the axial direction of the shaft 210. It is also possible to employ a single form-locking connection which is designed to hold the shaft 210 and the flange 201 against axial and angular movements relative to each other. Still further, it is possible to make the flange 201 of one piece with the shaft 210.

At least one layer of the contact portion 230 can be made of sheet steel or another suitable metallic sheet material. However, it is also possible (and often advisable) to employ a contact portion 230 having at least one layer consisting of or containing a synthetic plastic (e.g., elastomeric) material, particularly a material which exhibits superior sound deadening or sound absorbing characteristics. The layers of the contact portion 230 can consist of identical or different materials and their thicknesses may but need not be identical. Furthermore, the contact portion 230 can comprise more than two layers including at least two identical layers and one or more different layers.

Still further, the contact portion 230 can be assembled of two, three or more neighboring sectors having abutting or spaced apart radially extending surfaces each exteding from the opening 222 to the rim 231 and the latter can consist of an annulus of discrete arcuate portions, one for each of the sectors.

Rim 231 can be provided with teeth mating with complementary teeth at the marginal portion of the flange 201 and serving to prevent rotation of the flange 201 and the contact portion 230 relative to each other. In addition, the layer 230b can be bonded to the flange 201. Alternatively, only the rim 231 can be bonded to the marginal portion of the flange 201. For example, the rim 231 can be welded to the marginal portion of the flange 201 and the layer 230b can be glued to the adjacent conical surface 232 of the flange 201. Alternatively, the contact portion 230 can be form-lockingly and/or frictionally secured to the flange 201.

Figure 3B:
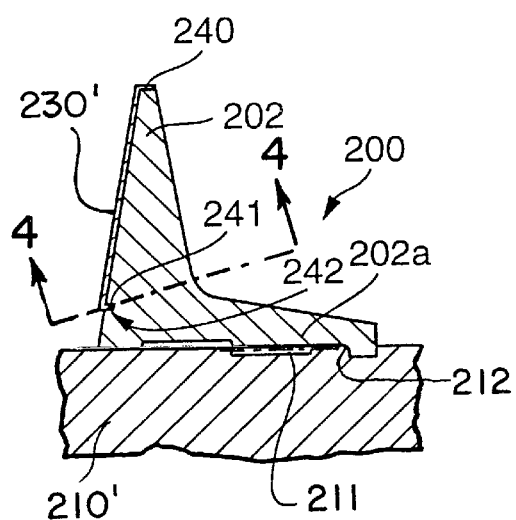

The flange 202 of FIG. 3b is movable axially of the shaft 210' but is held against rotation relative to the shaft 210' by axially parallel teeth 211 provided on the shaft 210' and extending into complementary tooth spaces 212 of a sleeve 202a forming the radially innermost part of the flange 202 (or vice versa). As mentioned hereinbefore, the means for moving the flange 202 axially of the shaft 210' to any one of a given (e.g., infinite) number of different positions and for thereupon maintaining the flange 202 in a selected axial position can comprise one or more motors (such as double-acting hydraulic or pneumatic cylinder and piston units, not shown in FIG. 3b). That side of the flange 202 which is adjacent the chain (such as 203) in actual use of the transmission embodying the structure of FIG. 3b includes a hollow frustoconical contact portion 230' having a collar or rim 240 which at least partially surrounds the radially outermost portion of the flange 202. The contact portion 230' further comprises an annular radially innermost portion 241 in the form of a relatively short axially parallel projection received in a complementary recess or socket 242 of the flange 202 at a relatively short radial distance from the periphery of the shaft 210'. If the projection 241 comprises two or more discrete (circumferentially spaced-apart) sections or teeth, and if the socket 242 includes a discrete arcuate portion for each discrete section or tooth of such projection, the contact portion 230' is automatically held against angular movement reative to the flange 202 as soon as the sections or teeth of the projection 241 are properly received in the adjacent portions of the socket 242. The rim 240 can be crowned in the same way as the rim 231 of FIG. 3a.

The contact portion 230' can be bonded (such as glued, welded or soldered) to the adjacent conical surface of the additional portion (flange) 202 of the sheave including the structure of FIG. 3b. In addition (or alternatively), the contact portion 230' can be mechanically secured (e.g., riveted, bolted, screwed and/or pinned and/or clamped and/or otherwise form-lockingly connected) to the flange 202. The socket 242 is, but need not be, disposed at a certain radial distance from the periphery of the shaft 210'.

The rim 240 and/or the projection 241 can constitute a suitably deformed section of the (frustoconical) main part of the contact portion 230', or the sections 240, 241 can be bonded to such main part.

The rim 240 can be a circumferentially complete ring-shaped section of the contact portion 230' or it can comprise discrete tongues or teeth extending into complementary spaces in the peripheral surface of the marginal portion of the flange 202. Each of the parts 240, 241 can have one or more (e.g., an entire annulus of) discrete teeth preferably extending in parallelism with the axis of the shaft 210'.

Figure 3C:
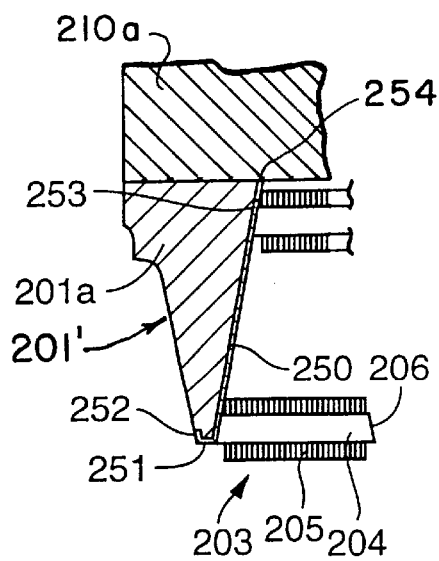
FIG. 3c shows a portion of a sheave constituting a modification of the sheaves shown in FIGS. 1, 3a and 3b.

FIG. 3c illustrates another mode of non-rotatably securing a hollow conical contact portion 250 to an additional portion (flange) 201' having a hub 201a which is rigidly secured to a shaft 210a. The hub 201a has an annulus of teeth 254 which surround the adjacent portion of the shaft 210a and mate with an annulus of internal teeth 253 provided at the radially inner portion of the contact portion 250.

The radially outer part of the contact portion 250 includes a collar or rim 251 which surrounds the marginal portion of the flange 201' and is provided with one or more teeth 252 or analogous protuberances extending radially inwardly and received in complementary recesses at that side of the flange 201' which faces away from the major part of the contact portion 250. The teeth 252 prevent the rim 251 from moving axially of the shaft 210a and off the marginal portion of the flange 201'. If desired, the teeth 252 and the complementary sockets of the flange 201' can be designed to hold the contact portion 250 on the flange 201' by snap action.

Figure 3D:
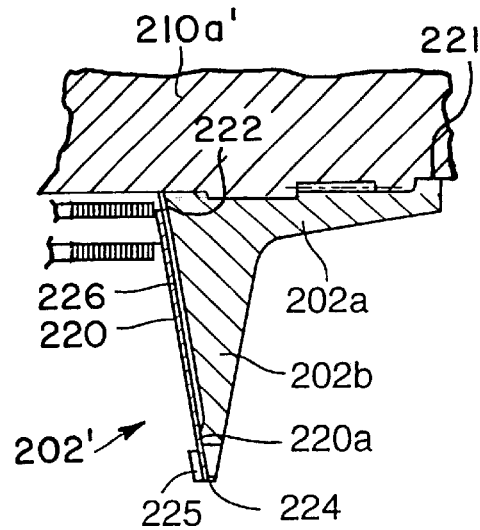
FIG. 3d shows a portion of a sheave constituting a modification of the sheaves shown in FIGS. 1, 3a, 3b and 3c.

Referring to FIG. 3d, there is shown a portion of a sheave having a contact portion 220 and an additional portion or flange 202' which is axially movably but non-rotatably mounted on a shaft 210a'. The flange 202' includes a radially inner portion or hub 202a which surrounds the shaft 210a' and a radially outer portion 202b which carries the contact portion 220. The marginal (radially outermost) portion of the flange 202' is provided with one or more tapped holes or bores 224 (only one shown in FIG. 3d) for the shank(s) of (one or more) threaded fastener(s) 225 which serves or serve to secure the adjacent radially outer part 220a of the contact portion 220 to the radially outer portion 202b of the flange 202'. The fastener or fasteners 225 can hold the contact portion 220 against axial and angular movements relative to the flange 202'. The threaded fastener or fasteners 225 can be replaced with one or more rivets, snap-on connectors, male and female detents (such as plugs and sockets) or the like. For example, the fasteners 225 can be replaced with suitable prongs (not shown) forming part of the contact portion 220, extending through the holes or bores 224 in the marginal portion of the flange 202' and having tips bent over the conical right-hand side of the flange portion 202b to establish a reliable form-locking connection between the parts 220 and 202b.

However, it is equally within the purview of the invention to replace the form-locking (rigid) connection between the parts 220 and 202b with a suitable (reliable) frictional engagement which suffices to ensure that these parts rotate as a unit.

The contact portion 220 and/or the adjacent conical surface of the portion 202b of the flange 202' is provided with one or more channels 226 filled with a fluid (such as oil or ATF=automatic transmission fluid). The fluid in the channel or channels 226 acts not unlike a cushion or buffer which absorbs shocks when the transmission including the flange 202' is in actual use. The fluid in the channel or channels 226 can form part of (i.e., it can communicate with) a supply of fluid which is normally confined in the transmission case.

The channel or channels 226 can extend radially and/or circumferentially of the portion 202b of the flange 202' and/or in one or more other directions. As used herein, the term "channel" is intended to embrace straight or meandering (or otherwise curved) grooves having a substantially constant width, grooves having portions of different widths, as well as depressions which can accumulate pools of a suitable shock absorbing fluid.

The features which are shown in FIGS. 1, 3a, 3b, 3c and 3d can be utilized interchangeably or in any suitable combination with each other. For example, at least one of the contact portions 230, 230' and 250 and/or at least one of the flanges 201, 202 and 201' can be provided with one or more fluid-receiving channels (226). Furthermore, the two contact portions on the flanges of a sheave can but need not be identical. Moreover, the exposed surface of the contact portion 230, 230', 250 and/or 220 can be bombarded and/or otherwise treated in a manner as described with reference to FIG. 1. Alternatively, and as also described hereinbefore, the contact portions can form integral parts of (i.e., they can be of one piece with) the respective flanges, and the exposed surfaces of such one-piece flanges are then bombarded and/or otherwise treated in accordance with one or more techniques described hereinbefore.

Figure 4:
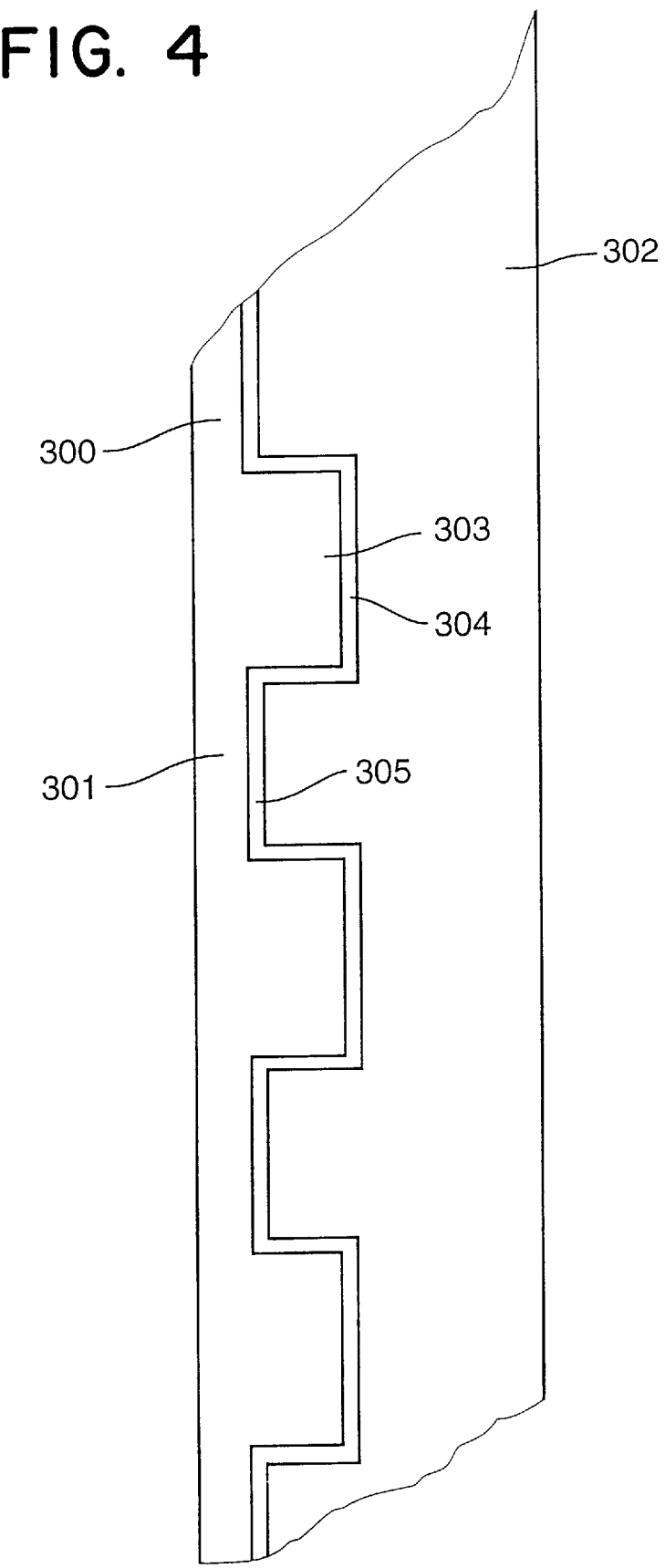
FIG. 4 is an enlarged fragmentary developed sectional view of a sheave, the section being taken substantially as seen in the direction of arrows from the line IV—IV in FIG. 3b but the sheave of FIG. 4 constituting a modification of that shown in FIG. 3b and of those shown in FIGS. 1, 3a, 3c and 3d.

FIG. 4 is an enlarged fragmentary developed sectional view of a flange 302 substantially as seen in the direction of arrows from the line IV—IV in FIG. 3b. Thus, the flange 302 corresponds to the flange 202 and the contact portion 300 of FIG. 4 corresponds to (but need not be identical with) the contact portion 230'. The radially inner zone of the contact portion 300 includes tongues or teeth 303 alternating with tongues or teeth 305 of the adjacent radially inner part of the flange 302. The latter has recesses 304 for the teeth 303, and the contact portion 300 has recesses 301 for the teeth 305. The recesses 301 can be provided in a collar (corresponding to the collar 241 of FIG. 3b) of the contact portion 300, and the recesses 304 can constitute deeper portions of a socket corresponding to the socket 242 shown in FIG. 3b. The teeth 303 can form a first annulus which spacedly surrounds the shaft (corresponding to the shaft 210' of FIG. 3b) for the flange 302, and the teeth 305 can form a similar annulus also surrounding the shaft for the flange 302. The conical surface of the flange 302 (i.e., the surface confronting the concealed side of the contact portion 300) is located at the levels of top lands of the teeth 305.

FIG. 4 shows a presently preferred but optional design of a (form-locking) connection between a contact portion (300) and an additional portion or flange (302) of a sheave. Thus, and as already mentioned above, the contact portion can be a press fit on the additional portion so that the frictional engagement between these portions suffices to ensure that the portion 300 shares all rotary movements of the portion 302 and vice versa.

The abutting surfaces of the portions 300, 302 need not be bonded, bolted, riveted or otherwise rigidly connected to each other if the mating teeth 303, 305 are designed to ensure that the portions 300, 302 are compelled to rotate with each other, at least when the exposed surface of the portion 300 is engaged by the pintles of a chain, e.g., by the pintles 204 of a chain 203 of the type shown in FIG. 3c.

The contact portion 300 (or any other contact portion) can comprise a single layer or several layers or films or strata of a metallic, plastic or other suitable material. For example, at least one metallic layer can be utilized in conjunction with at least one nonmetallic layer. The number of layers can exceed (even greatly exceed) two, and such layers can be permanently affixed to each other to form a laminate which is preferably shaped to closely overlie the adjacent surface of a flange. Sheet metal is one of presently preferred materials or layers of a (first) contact portion which is to be applied to a flange. Synthetic plastic and/or elastomeric layers or films or strata can be used with advantage if the contact portions are to absorb or dampen noise.

Referring again to FIG. 3d, the channel 226 can be omitted if the connection between the contact portion 220 and the flange 202' is such that at least one shallow but large chamber is established between the confronting surfaces of the parts 202' and 220. Such chamber can be filled with a confined body of a suitable hydraulic fluid or it can communicate with the interior of a fluid-filled housing or case for the transmission. In other words, the cushion between the parts 220, 202' can be formed by a stagnant (confined) body of oil, ATF or another suitable fluid, or by a portion of the customary supply of fluid in the transmission.

The central opening 222 of the contact portion 220 is dimensioned in such a way that the contact portion 220 and the shaft 210' define an annular clearance 221.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our above outlined contribution to the art of transmissions and, therefore, such adaptations should and are intended to be comprehended within the meaning and range of equivalence of the appended claims.

What is claimed is:

1. A transmission for use in a power train of a motor vehicle, comprising first and second conical rotary sheaves; an endless torque transmitting device trained over said conical sheaves, said sheaves having first conical contact portions and said device having at least one second contact portion in frictional engagement with said first conical contact portions to transmit torque from one of said sheaves to the other of said sheaves when said one sheave is rotated by a prime mover; at least said first sheave having an additional conical contact portion in non-rotatable, torque transmitting engagement with the first conical contact portion of said first sheave, the first conical contact portion being interposed between the additional conical contact portion and the second contact portion; and at least one fluid film between the first conical contact portion and the additional conical contact portion of said first sheave.

2. The structure of claim 1 wherein said transmission contains a supply of fluid and said at least one fluid film forms part of said supply.

3. The structure of claim 1, wherein said torque transmitting engagement between said portions of said first sheave is a form-locking engagement which compels said portions of said first sheave to rotate with each other.

4. The structure of claim 1, wherein said torque transmitting engagement between said portions of said first sheave is a frictional engagement.

5. The structure of claim 1, wherein said first contact portion of said first sheave is thin-walled.

6. The structure of claim 1, wherein said first portion of said first sheave has a substantially conical shape.

7. The structure of claim 6, wherein said first contact portion of said first sheave is crowned.

8. The structure of claim 1, wherein said additional portion of said first sheave includes a flange having a radially outermost portion, said first contact portion of said first sheave including a thin-walled shroud having a rim surrounding said radially outermost portion of said flange.

9. The structure of claim 8, wherein said rim includes a substantially annular collar.

10. The structure of claim 1, wherein said additional portion of said first sheave includes a flange having a radially inner portion surrounding a central axis of said first sheave and provided with at least one socket for a complementary projection of said first contact portion of said first sheave.

11. The structure of claim 10, wherein said projection includes a collar provided at a radially inner portion of a substantially frustoconical shroud of said first contact portion of said first sheave and extending at least substantially in the direction of said central axis.

12. The structure of claim 10, wherein said projection is at least substantially ring-shaped.

13. The structure of claim 10, wherein said projection extends at least substantially in the direction of said central axis and includes a plurality of sections spaced apart from each other in a circumferential direction of said first sheave.

14. The structure of claim 1, wherein said first contact portion of said first sheave is thin-walled and includes at least one projection extending at least substantially in the direction of a central axis of said first sheave and being received in a complementary recess of said additional portion to prevent rotation of said portions of said first sheave relative to each other.

15. The structure of claim 14, wherein said at least one projection is form-lockingly connected to said additional portion of said first sheave.

16. The structure of claim 1, further comprising at least one fastener non-rotatably securing said first contact portion of said first sheave to said additional portion.

17. The structure of claim 16, wherein said at least one fastener includes a threaded fastener.

18. The structure of claim 16, wherein said at least one fastener includes a rivet.

19. The structure of claim 16, wherein said at least one fastener includes at least one protuberance provided on one portion and received in a socket of the other portion of said first sheave.

20. The structure of claim 1, wherein said first contact portion of said first sheave is bonded to said additional portion.

21. The structure of claim 20, wherein said first contact portion of said first sheave is glued to said additional portion.

22. The structure of claim 20, wherein said first contact portion of said first sheave is welded to said additional portion.

23. The structure of claim 20, wherein said first contact portion of said first sheave is soldered to said additional portion.

24. The structure of claim 1, wherein said first contact portion of said first sheave is maintained in frictional engagement with said additional portion so that said portions of said first sheave share rotary movements about a central axis of said first sheave.

25. The structure of claim 1, wherein said first contact portion of said first sheave is a press fit on said additional portion.

26. The structure of claim 1, wherein said first contact portion of said first sheave is a substantially loose fit over said additional portion.

27. The structure of claim 1, wherein said first contact portion of said first sheave comprises at least one layer of a metallic sheet material.

28. The structure of claim 1, wherein said first contact portion of said first sheave comprises a plurality of components and at least one of said components consists of a sheet material.

29. The structure of claim 28, wherein said sheet material is a metallic material.

30. The structure of claim 1, wherein said first contact portion of said first sheave is laminated.

31. The structure of claim 30, wherein said laminated portion comprises at least one metallic layer.

32. The structure of claim 1, wherein said first contact portion of said first sheave comprises at least one flexible layer.

33. The structure of claim 32, wherein said flexible layer contains a synthetic plastic material.

34. The structure of claim 32, wherein said flexible layer contains an elastomeric material.

35. The structure of claim 1, wherein said first contact portion of said first sheave comprises at least one damping layer.

36. The structure of claim 35, wherein said layer contains a synthetic plastic material.

37. The structure of claim 35, wherein said layer contains an elastomeric material.

38. The structure of claim 1, wherein said first contact portion of said first sheave comprises at least one thin-walled member overlying said at least one fluid film.

39. The structure of claim 1, wherein said at least one contact portion is hardened at least in the region of said surface thereof.

40. The structure of claim 1, wherein said at least one contact portion is thin-walled and hardened at least substantially all the way between said exposed surface and a second surface opposite said exposed surface.

41. The structure of claim 1, wherein said exposed surface is blasted.

42. The structure of claim 41, wherein said exposed surface is sandblasted.

43. The structure of claim 1, wherein said exposed surface is peened.

44. The structure of claim 1, wherein the treatment of said exposed surface includes bombardment with a volatile material.

45. The structure of claim 1, wherein at least one of said first contact portions includes a substantially conical layer overlying at least one body of a hydraulic fluid.

* * * * *